US008452271B2

(12) United States Patent
Zoeckler et al.

(10) Patent No.: US 8,452,271 B2
(45) Date of Patent: May 28, 2013

(54) PORT INITIATED NUMBER GATEWAY (75) Inventors: Dennis L. Zoeckler, Brighton, MI (US);
Shawn F. Granda, Novi, MI (US)

(73) Assignee: General Motors LLC, Detroit, MI (US)

( * ) Notice: Subject to any disclaimer, the term of this patent is extended or adjusted under 35 U.S.C. 154(b) by 625 days.

(21) Appl. No.: 12/709,906

(22) Filed: Feb. 22, 2010

(65) Prior Publication Data
US 2011/0207463 A1 Aug. 25, 2011

(51) Int. Cl.
*H04M 3/00* (2006.01)

(52) U.S. Cl.
USPC .......................................... 455/418; 455/419

(58) Field of Classification Search
USPC .................................. 455/418–419
See application file for complete search history.

(56) References Cited

U.S. PATENT DOCUMENTS

| 6,138,023 A * | 10/2000 | Agarwal et al. ............... 455/445 |
| 2005/0191999 A1* | 9/2005 | Tezuka ........................... 455/420 |
| 2007/0093243 A1* | 4/2007 | Kapadekar et al. ............ 455/419 |
| 2008/0146202 A1* | 6/2008 | Krause ........................ 455/414.1 |

* cited by examiner

*Primary Examiner* — Steven Lim
(74) *Attorney, Agent, or Firm* — Leydig, Voit & Mayer, Ltd.

(57) ABSTRACT

The described method and system enables a telematic operator to determine a connectivity standing of devices requiring a port change from one wireless carrier to another. In particular, a modem initiates a call to each affected mobile directory number (MDN) and verifies connectivity to the correct vehicle using a telematic authentication encrypted key with appropriate verification of the stored MIN, electronic serial number (ESN), and station ID (STID). The list of verified devices of good connectivity is used to facilitate the MIN change to those telematic devices whereby a higher probability of success is most likely to occur. Moreover, by distinguishing devices most likely to commit a MIN port on the first attempt, a potential impact population whereby success is not likely is also developed, so that further appropriate scrutiny or action can be executed for problematic devices.

20 Claims, 5 Drawing Sheets

PORT INITIATED NUMBER GATEWAY

TECHNICAL FIELD

The present disclosure relates to the management of cellular devices, and more particularly, to the large scale porting of devices from one carrier to another.

BACKGROUND OF THE INVENTION

In the United States and other developed countries, total network traffic by cellular users, though already significant, continues to increase substantially each year. This continued increase is driven by many factors including improved cellular devices, continuing deployment of advanced 3G technologies, increasingly affordable pricing and increased indoor use of cellular devices, e.g., to replace or supplement land lines. Moreover, with respect to data traffic, the size of data objects is continually increasing, keeping pace with the expanded capabilities of the networks.

With the great pace of cellular adoption, the subscriber base continues to expand and shift. There are many cellular carriers that supply service to subscribers, and with the varied pricing and service provided by carriers, it is not uncommon for a subscriber to shift their business from one carrier to another. There can also be a shift of subscribers from one carrier to another due to a divestiture/acquisition of properties involving a large wireless carrier.

In the past, such migrations were labor-intensive and error-prone. In particular, a large porting of several thousand vehicles at once required that a list of affected vehicles be sent to the telematic operator. After the list was received, a manual process was used to convert the vehicles, one vehicle at a time. The process was manually performed by both the telematic operator and the wireless carrier with little coordination and a higher-than-normal potential for subscriber impact during the process. For example, a telematics operator executing a porting operation may simply attempt to connect to devices in random order, numerical order, or alphabetical order. However, the inventors have discovered that this can incur significant delays, even for properly functioning devices, if there are one or more affected devices for which connectivity is problematic.

A system and method are needed for enabling large scale reassignment of subscribers from one carrier to another without requiring the painstaking and error prone reassignment process currently in use.

BRIEF SUMMARY OF THE INVENTION

The invention provides a system and apparatus for allowing a telematic operator to determine a connectivity success ratio involving affected vehicles requiring a port change from one wireless carrier to another. In many instances where a wireless carrier purchases the wireless spectrum of a competitor market, the wireless carrier must "port" the successive wireless subscribers to its main transit switching office ("MTSO") with signaling to other carriers. This change requires a new mobile identification number ("MIN") to identify the new carrier as the provider of service and is subsequently assigned to all affected telematic devices. The telematic operator "connects" to all affected telematic devices to change to the newly assigned MIN in order to satisfy porting requirements.

The wireless carrier notifies the telematic operator of affected telematic devices requiring a new MIN to be assigned due to divestiture or acquisition requirements as set by the Federal Communications Commission (FCC). Generally a deadline for MIN conversion is included in the list of affected devices. Affected telematic devices not converted by the deadline will have limited service until MIN port required changes are completed.

Acting with this information, the telematic operator uses the described system to identify devices with a high probability of success in order to begin conversion of affected devices with a new MIN and porting with the wireless provider. The described approach allows the telematic operator to determine over a successive period, those affected devices where a successful connection is most likely to occur and a new MIN can most likely be instituted with porting to be completed by the wireless carrier. Thus, the telematics operator need not simply attempt to connect to devices in a random order without regard to determining a high probability of success, incurring connectivity expenses in trying to manage the affected population. The described system also assures the telematic operator the ability to coordinate more closely with the wireless operator in completing the port within a reduced timeframe thus, assuring minimal subscriber impact or loss of service.

The system described herein establishes a list of affected telematic devices requiring a new MIN to be assigned from a list provided by the wireless carrier. This list is then processed to determine a status of the telematic device (i.e., active subscriber status, hands-free calling status, service-state, etc.). The telematic operator creates a list of probable vehicles with which to perform a connectivity success check to determine the probability of connecting to the vehicle in order to perform the MIN change. A list of likely affected vehicles is then created, whereupon a modem initiates a call to each affected vehicle mobile directory number (MDN) and verifies connectivity to the correct vehicle using a telematic authentication encrypted key with appropriate verification of the stored MIN, electronic serial number (ESN), and station ID (STID).

Upon receipt of an encryption response indicating success, or if no connection is secured with the affected vehicle, the result is tabulated into a summary table. Where no response is stored for an affected vehicle, the telematic operator initiates a cycled connectivity attempt throughout a 24 hour period. Final results for the day's activity may be provided in a summary file, which may be used by the telematic operator to facilitate the MIN change to those telematic devices whereby a higher probability of success is most likely to occur.

The use of this technique allows the development of a "high" probability of success listing for required MIN ports involving affected telematic devices, and ensures minimal subscriber impact when a new MIN is required for porting. Moreover, coordination with the wireless provider allows configuration of both the telematic device and the network in the most efficient manner. By ensuring the telematic operator is able to distinguish those devices most likely to commit a MIN port on the first attempt, a potential impact population whereby success is not assured is developed, so that further appropriate scrutiny or action can be executed for problematic devices.

A significant advantage of the system is that it allows both the telematic operator and the wireless carrier to complete port requests in the timeframe required by the FCC. The efficiency and labor reduction provided by the invention also reduce the overall connectivity expense borne by the telematic operator in performing a MIN change to a set of vehicles, and creates an opportunity for the telematic operator and wireless operator to port batches of affected devices at a single time.

DETAILED DESCRIPTION OF THE INVENTION

Before discussing the details of the invention and the environment wherein the invention may be used, a brief overview is given to guide the reader. In general terms, not intended to limit the claims, the invention includes a system and apparatus for porting large numbers of subscribers from one wireless carrier to another. This scenario can arise in a number of ways, but one common cause is the purchase by a wireless carrier of the wireless spectrum of a competitor market. In such a case, the wireless carrier must "port" the wireless subscribers to its main transit switching office (MTSO) with appropriate signaling to other carriers. This change requires assignment of a new MIN for each device to identify the new carrier as provider of service and requires the telematic operator to connect to all affected telematic devices to change to the newly assigned MIN. The device Mobile Dialing Number (MDN), sometimes referred to as the mobile directory number, may be initially the same as or different from the device MIN, but is typically different from the MIN once porting takes place.

The described approach establishes a list of affected telematic devices, determines the relevant status of each telematic device (i.e., active subscriber status, hands-free calling status, service-state, etc.), and creates a list of probable vehicles with which to perform a connectivity success check to determine the probability of connecting to the vehicle in order to perform the MIN change.

The system then initiates a call to the affected vehicle mobile directory number and verifies connectivity to the correct vehicle using a telematic authentication encrypted key with appropriate verification of the stored MIN, electronic serial number, and station ID. The results of this test are tabulated. Where no response is stored for affected vehicles, the telematic operator may order a cycled connectivity attempt throughout a 24 hour period. Final results are provided in a summary file which is used to execute the MIN change with respect telematic devices displaying a higher probability of connection success is most likely to occur. In this way, subscribers with problem-free devices are not forced to wait unnecessarily, and for devices that may exhibit connection problems, an impact population is identified for further scrutiny.

Figure 1:
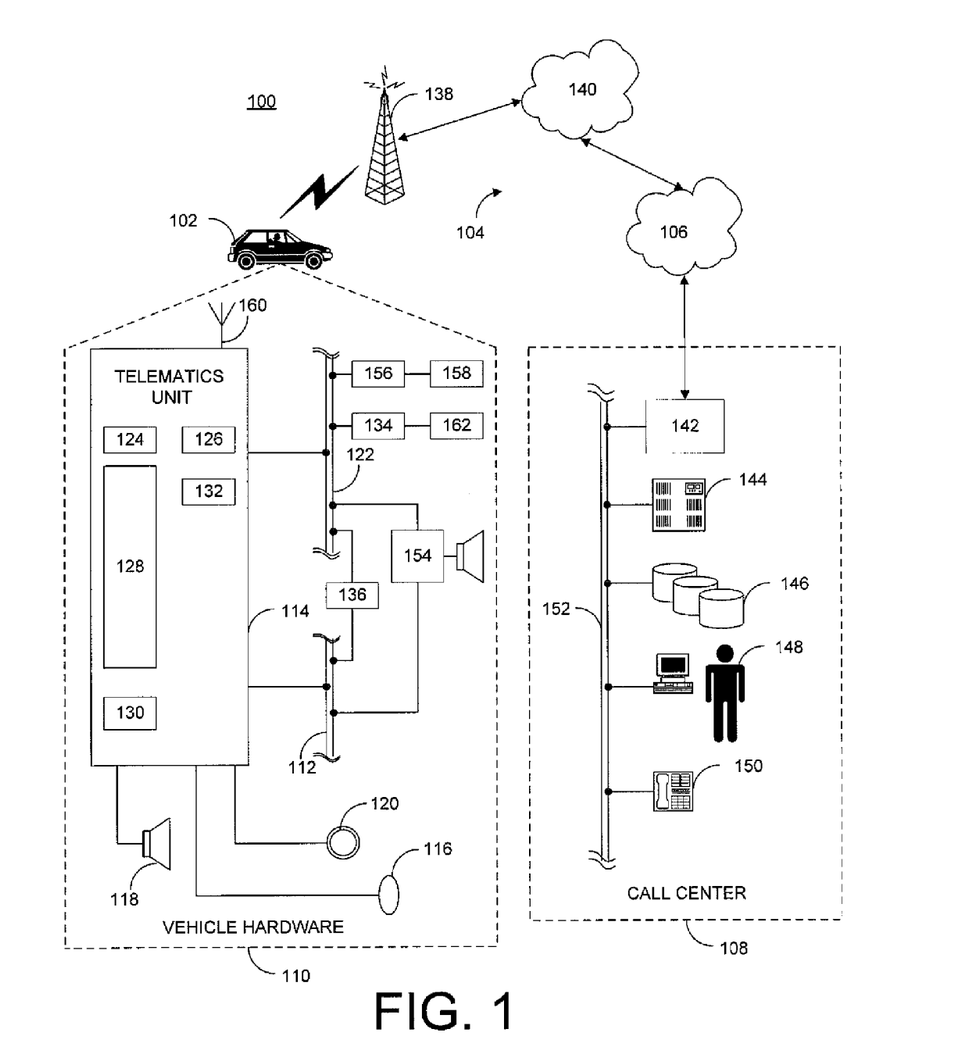
FIG. 1 is a schematic diagram of an operating environment for a mobile vehicle communication system.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
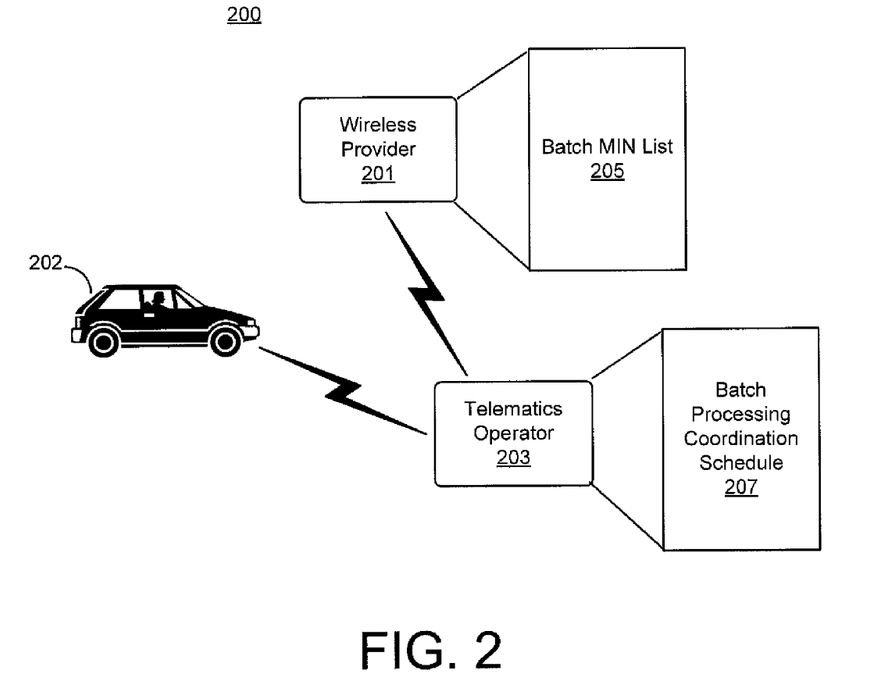
FIG. 2 is a schematic network diagram illustrating an exemplary architecture of components, relationships, and generated structures used by the system.

Turning to the details of the system operating within the described environment, an exemplary logical architecture 200 is illustrated in schematic form in FIG. 2 to show the primary components, their relationships, and certain structures generated and used by the system. The illustrated system 200 includes a device of interest, illustrated as a telematics unit associated with the vehicle 102 (202). It will be appreciated that the described system 200 operates with respect to a large number of such devices, but a single device is shown for clarity.

The illustrated architecture 200 also includes a wireless provider 201, and a telematics operator 203 associated with that wireless provider 201. The illustrated wireless provider 201 includes hardware and facilities associated with providing wireless services. The telematics operator 203 may be a human or automated operating entity for interfacing with devices and device users, and may be collocated with the wireless provider 201 or may be located remotely with respect to the wireless provider 201.

In order to identify the affected population of devices to be ported, the wireless provider 201 constructs a batch MIN list 205 as will be described in greater detail with reference to later figures. The batch MIN list 205 is transferred to the telematics operator 203. Through a process to be described in greater detail below, the telematics operator 203 generates a batch processing coordination schedule 207 for executing a portion of the porting process in cooperation with the wireless provider 201.

Figure 3:
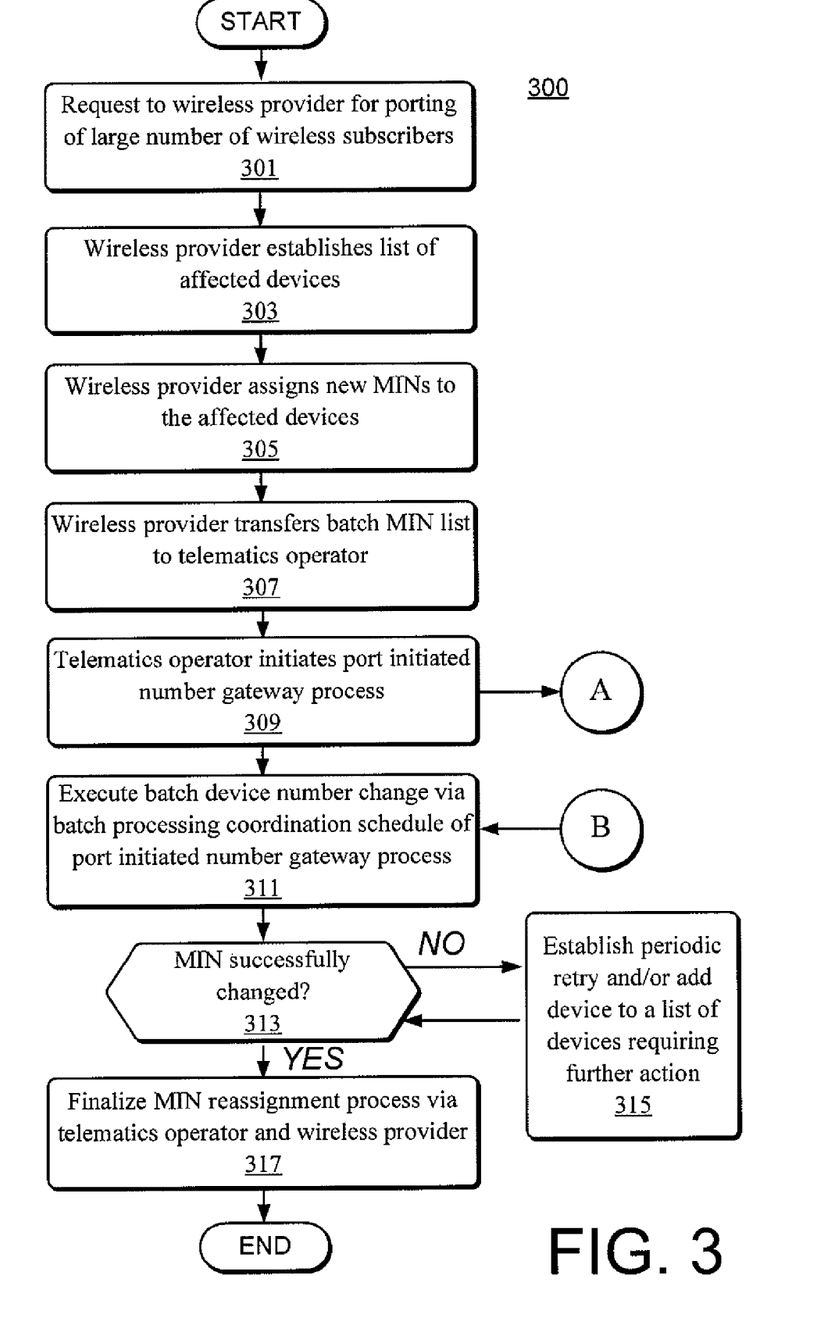
FIG. 3 is a flow chart illustrating in overview a porting process in keeping with the disclosed principles.

Within the described exemplary environment and architecture, the telematics operator and wireless provider are coordinated as shown in FIG. 3. In particular, FIG. 3 is a flow chart illustrating an overview of the porting process in keeping with the disclosed principles. At stage 301 of the process 300, a porting of a large number of subscribers is requested, e.g., pursuant to a purchase or divestiture. In response to this notification, the wireless provider establishes a list of affected devices in stage 303. At stage 305, the wireless provider assigns new MINs to the affected devices. This step involves associating each new MIN with its respective device at the wireless provider, but does not impact the devices themselves at this stage. The MIN assignment step may be executed manually but is preferably executed in an automated fashion based on the list of affected devices and a list of available MINs or MIN ranges.

Turning to stage 307, the wireless provider transfers the list of affected devices to the telematics operator as a batch MIN list, which identifies the affected devices and the associated newly assigned MINs. At this point, the telematics operator initiates a port initiated number gateway process in stage 309 via exit point A. Returning at stage 311 via entry point B, the process 300 executes a batch device number change in keeping with a batch processing coordination schedule generated by the port initiated number gateway process.

During this step, for each affected device, the process attempts to connect and change the MIN associated with the device. With respect to devices for which the MIN is not initially successfully changed as analyzed at stage 313, the process 300 may establish a periodic retry and/or add an identifier for the device to a list of devices requiring further action at stage 315. For each device, once the process has finished stage 313, the process passes to stage 317 with respect to that device, wherein the telematics operator and wireless provider are coordinated to finalize the MIN reassignment process as described in FIG. 5. Once the MIN of the device has been changed at stages 311 et seq., a predetermined time limit may apply, within which the porting must be completed. For example, Federal regulations may require that all subsequent required porting activities be completed within 60 minutes.

Figure 4:
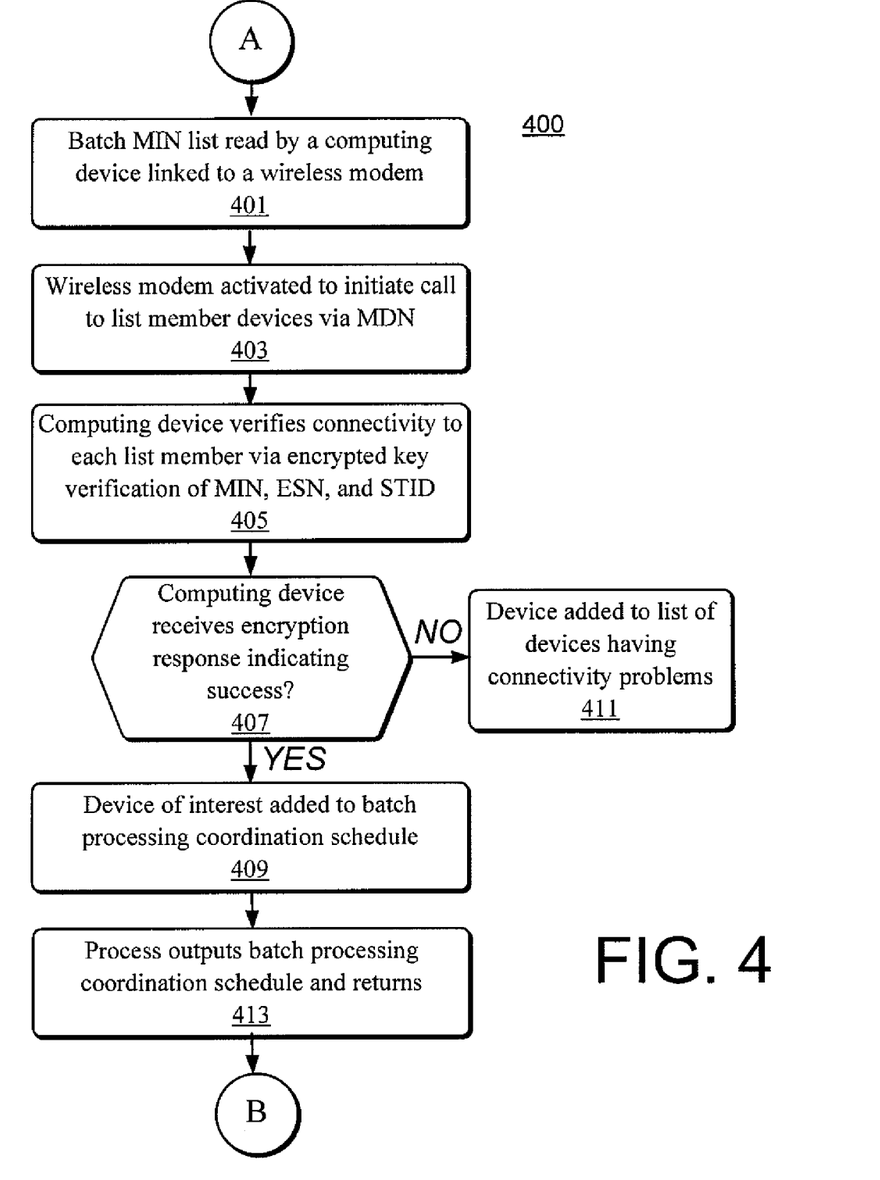
FIG. 4 is a flow chart illustrating an exemplary port initiated number gateway process in accordance with an aspect of the disclosed principles.

As noted above with reference to stage 309, the telematics operator initiates a port initiated number gateway process to generate a batch processing coordination schedule. The operation of the port initiated number gateway process is illustrated in detail in FIG. 4. In particular, FIG. 4 is a flow chart illustrating an exemplary port initiated number gateway process 400.

After commencing at entry point A of the port initiated number gateway process 400, the batch MIN list read by a computing device, i.e., a server, PC, etc., linked to a wireless modem at stage 401. At stage 403, the wireless modem is activated to initiate a wireless call to each vehicle on the list via an appropriate mobile directory number (MDN) associated with the vehicle telematics device. The modem and computing device may be collocated or remote from one another, and may be placed at physical premises associated with the wireless provider, the telematics operator, or both.

At stage 405, the computing device, via the modem, verifies connectivity to each vehicle using a telematic authentication encrypted key with appropriate verification of the stored MIN, electronic serial number (ESN), and station ID (STID). This ensures that the determination of connectivity and the eventual MIN change within the contacted device are executed with respect to the correct device.

At stage 407, with respect to each device, if the computing device receives an encryption response indicating success, then the device of interest is added to the batch processing coordination schedule at stage 409. Otherwise, and in one implementation only after multiple unsuccessful attempts, the device may be added to a list of devices having connectivity problems at stage 411. After the execution of stages 407-411 for all devices on the batch MIN list, the resultant batch processing coordination schedule lists the devices for which MIN change has a high probability of success. At stage 413, the process 400 outputs the batch processing coordination schedule and returns to process 300 via exit point B.

Figure 5:
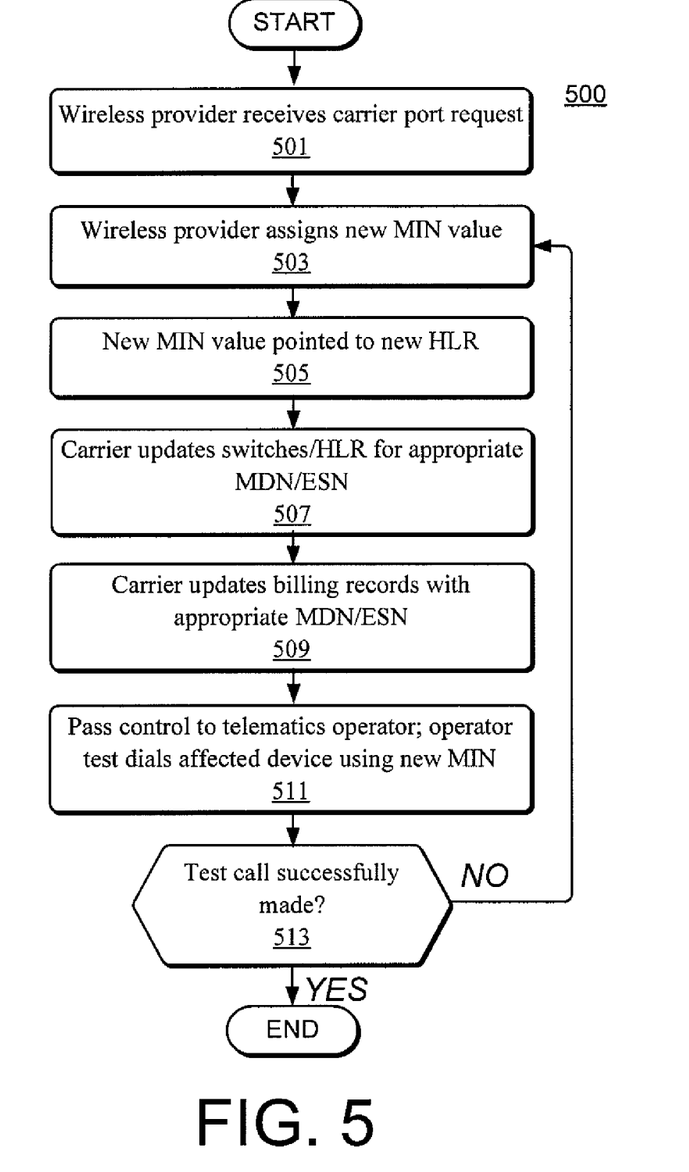
FIG. 5 is a flow chart illustrating a process for finalizing a subscriber porting process in accordance with an aspect of the disclosed principles.

As noted earlier with respect to the process 300 of FIG. 3, the telematics operator and wireless provider are coordinated to finalize the MIN reassignment process after the device MINs are successfully changed by the telematics operator. This process is illustrated in FIG. 5. In particular, FIG. 5 is a flow chart illustrating a process 500 for finalizing the porting process. At stage 501 of the process 500, the wireless provider receives a carrier port request, and then assigns the new MIN value in stage 503. The new MIN value is pointed to the new home location register (HLR) at stage 505. As will be appreciated, the HLR is a database that provides permanent storage for subscriber data and service profiles.

At stage 507, the carrier updates switches and the HLR with respect to the new MIN to reflect the appropriate MDN/ESN. The carrier also updates billing records to associate the new MIN with appropriate MDN/ESN at stage 509. At this point, control passes to the telematics operator, which test dials the affected device using the new MIN at stage 511. At stage 513, the telematics operator determines whether the test call was successfully made, and if the call was successful, terminates the process. It will be appreciated that other ancillary activities may be executed thereafter, such as notifications to the wireless provider and so on. If at stage 513, it is found that the test call via the new MIN was not successful, then the process 500 reverts to stage 503.

It will be appreciated that in various implementations, the described system and method facilitate identification of the significant impacted telematic device population early in the porting process, initiation of immediate and coordinated porting of the affected population with the wireless carrier, and allow the telematic operator and wireless carrier to focus on the impacted telematic devices that can be ported with minimal disruption. The described system also ensures minimal reduction of subscriber service, and indeed, the inventors have found that in some cases, the entire porting process (from MIN rewrite of the telematic device to complete porting of the new MIN in the carrier billing and MTSO) can occur in about 24 minutes.

However, regardless of the level of economy and efficiency realized in any given implementation, it will be appreciated that the disclosed methods and implementations for subscriber porting are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of porting a plurality of wireless subscriber devices from one carrier to another comprising:
    receiving a request to port wireless subscriber devices from a first carrier to a second carrier;
    compiling a register of affected devices;
    assigning a replacement MIN to each affected device, wherein each device is associated with an existing MIN and the replacement MIN for each device differs from the existing MIN for that device;
    producing a batch MIN list which identifies the affected devices and the associated replacement MIN for each affected device;
    transferring the batch MIN list to a telematics operator to initiate a port initiated number gateway process to generate a batch processing coordination schedule, wherein the batch processing coordination schedule identifies devices of the affected devices that are considered to have a high likelihood of successful connection; and
    executing a batch device number change in an order defined by the batch processing coordination schedule.

2. The method of porting a plurality of wireless subscriber devices from one carrier to another according to claim 1, wherein the request to port wireless subscriber devices from a first carrier to a second carrier corresponds to an acquisition by the second carrier of a wireless spectrum associated with the first carrier.

3. The method of porting a plurality of wireless subscriber devices from one carrier to another according to claim 1, wherein the step of assigning a replacement MIN to each affected device comprises executing an automated MIN assignment process based on identities of the affected devices and an identification of available MINs.

4. The method of porting a plurality of wireless subscriber devices from one carrier to another according to claim 3, wherein available MINs are identified by one or more MIN ranges.

5. The method of porting a plurality of wireless subscriber devices from one carrier to another according to claim 1, wherein executing a batch device number change in an order defined by the hatch processing coordination schedule comprises:
    attempting to connect to each affected device identified in the batch processing coordination schedule;
    with respect to each device for which the attempt to connect is successful, changing the MIN associated with the device from the associated existing MIN to the associated replacement MIN; and
    with respect to each device for which the attempt to connect is not successful, executing a remedial process with respect to the device.

6. The method of porting a plurality of wireless subscriber devices from one carrier to another according to claim 5, wherein executing a remedial process with respect to the device comprises periodically repeating the step of attempting to connect to the device.

7. The method of porting a plurality of wireless subscriber devices from one carrier to another according to claim 5, wherein executing a remedial process with respect to the device comprises adding an identifier for the device to a list of devices requiring further action.

8. The method of porting a plurality of wireless subscriber devices from one carrier to another according to claim 1, wherein the batch processing coordination schedule includes only devices that have been contacted and verified via an existing MIN, an electronic serial number, and a station ID.

9. The method of porting a plurality of wireless subscriber devices from one carrier to another according to claim 1, wherein a portion of the plurality of wireless subscriber devices are telematics devices associated with respective vehicles.

10. A method of altering a MIN of each of a plurality of wireless subscriber devices comprising:
    assigning a replacement MIN to each device, wherein each device is associated with an existing MIN and the replacement MIN for each device differs from the existing MIN for that device;
    identifying a subset of the plurality of wireless subscriber devices that have a high likelihood of successful connection; and
    connecting to each of the subset of devices, to the exclusion of others of the plurality of wireless subscriber devices and replacing the existing MIN of each such device with the replacement MIN assigned to the device.

11. The method of altering a MIN of each of a plurality of wireless subscriber devices according to claim 10, wherein identifying a subset of the plurality of wireless subscriber devices that have a high likelihood of successful connection comprises: attempting wireless contact with each device; and for each device for which the attempted contact is successful, identifying the contacted device as having a high likelihood of successful connection.

12. The method of altering a MIN of each of a plurality of wireless subscriber devices according to claim 11, wherein attempting wireless contact with each device further comprises verifying an identity of each contacted device by the existing MIN, an electronic serial number, and a station ID associated with the device.

13. The method of altering a MIN of each of a plurality of wireless subscriber devices according to claim 10, wherein the step of replacing the existing MIN of each such device with the replacement MIN assigned to the device comprises executing an automated MIN assignment process based on identities of the affected devices and an identification of available MINs.

14. The method of altering a MIN of each of a plurality of wireless subscriber devices according to claim 13, wherein available MINs are identified by one or more MIN ranges.

15. The method of altering a MIN of each of a plurality of wireless subscriber devices according to claim 10, wherein replacing the existing MIN of each such device with the replacement MIN assigned to the device comprises:
   attempting to connect to each device in the subset of the plurality of wireless subscriber devices that have a high likelihood of successful connection;
   with respect to each device for which the attempt to connect is successful, changing the MIN associated with the device from the associated existing MIN to the associated replacement MIN if the attempt to connect to the device is successful; and
   with respect to each device for which the attempt to connect is not successful, executing a remedial process with respect to the device.

16. The method of altering a MIN of each of a plurality of wireless subscriber devices according to claim 15, wherein executing a remedial process with respect to the device comprises periodically repeating the step of attempting to connect to the device.

17. The method of altering a MIN of each of a plurality of wireless subscriber devices according to claim 15, wherein executing a remedial process with respect to the device comprises adding an identifier for the device to a list of devices requiring further action.

18. The method of altering a MIN of each of a plurality of wireless subscriber devices according to claim 10, wherein a portion of the plurality of wireless subscriber devices are telematics devices associated with respective vehicles.

19. A method of porting a plurality of wireless subscriber devices from one carrier to another comprising:
   receiving a request to port wireless subscriber devices from a first carrier to a second carrier;
   compiling a register of affected devices;
   assigning a replacement MIN to each affected device, wherein each device is associated with an existing MIN and the replacement MIN for each device differs from the existing MIN for that device;
   determining a connectivity of each affected device;
   compiling a list including a subset of the affected devices ranked by connectivity; and
   contacting each affected device wirelessly in an order determined by the device's connectivity rank to replace the existing MIN of the device with the replacement MIN assigned to the device.

20. The method of executing a data change with respect to a large number of wireless devices according to claim 19, wherein each wireless device is a telematics unit associated with a vehicle.

* * * * *